(12) United States Patent
Rauschenbach et al.

(10) Patent No.: US 11,249,814 B2
(45) Date of Patent: Feb. 15, 2022

(54) RESOURCE PLACEMENT CONTROL IN NETWORK VIRTUALIZATION SCENARIOS

(71) Applicant: NOKIA SOLUTIONS AND NETWORKS OY, Espoo (FI)

(72) Inventors: Uwe Rauschenbach, Poing (DE); Daniel Fey, Budapest (HU); Gyula Bodog, Budapest (HU)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 743 days.

(21) Appl. No.: 16/076,054

(22) PCT Filed: Feb. 8, 2016

(86) PCT No.: PCT/EP2016/052616
§ 371 (c)(1),
(2) Date: Aug. 7, 2018

(87) PCT Pub. No.: WO2017/137061
PCT Pub. Date: Aug. 17, 2017

(65) Prior Publication Data
US 2021/0191784 A1    Jun. 24, 2021

(51) Int. Cl.
*G06F 9/455*    (2018.01)
*G06F 9/50*    (2006.01)
(Continued)

(52) U.S. Cl.
CPC ........ *G06F 9/5077* (2013.01); *G06F 9/45558* (2013.01); *H04L 12/4641* (2013.01); *H04L 41/0893* (2013.01); *G06F 2009/45595* (2013.01)

(58) Field of Classification Search
CPC ............... G06F 9/507; G06F 9/45558; G06F 2009/45595; H04L 12/4641; H04L 41/0893
See application file for complete search history.

(56) References Cited

U.S. PATENT DOCUMENTS

2015/0358248 A1    12/2015    Saha et al.
2016/0335111 A1*    11/2016    Bruun ................. G06F 9/45558
2018/0262410 A1*    9/2018    Chou ..................... H04L 43/06

FOREIGN PATENT DOCUMENTS

CN    104170323 A    11/2014
CN    104601492 A    5/2015
(Continued)

OTHER PUBLICATIONS

May 27, 2019 Office Action issued in Japanese Patent Application No. 2018-560713.
(Continued)

*Primary Examiner* — Wissam Rashid
(74) *Attorney, Agent, or Firm* — Squire Patton Boggs (US) LLP

(57) ABSTRACT

There are provided measures for resource placement control in network virtualization scenarios. Such measures exemplarily comprise, in a network virtualization scenario, determining, by a first network entity managing a virtualized network function, constraints related to said virtualized network function, transmitting, by said first network entity, information indicative of said constraints to a second network entity managing resource capacity in said network virtualization scenario, and deciding, by said second network entity, resources or resource capacity to be allocated for said virtualized network function, based on said information indicative of said constraints.

17 Claims, 9 Drawing Sheets

(51) Int. Cl.
*H04L 12/46* (2006.01)
*H04L 12/24* (2006.01)

(56) References Cited

FOREIGN PATENT DOCUMENTS

| | | |
|---|---|---|
| CN | 105262664 A | 1/2016 |
| EP | 2 940 968 A1 | 11/2015 |
| EP | 2 955 631 A1 | 12/2015 |
| WO | 2014208661 | 12/2014 |
| WO | WO 2015/135611 A1 | 9/2015 |

OTHER PUBLICATIONS

DMTF Open Virtualization Format Specification, Version 2.1.1; 2015.
Rauschenbach et al NFVIFA(15)0001364r4; Multi-VIM Multi-Zone support on IFA007; 2015.
OpenStack Scheduling—OpenStack Configuralion Reference—liberty; 2015.
International Search Report & Written Opinion dated Oct. 5, 2016 corresponding to International Patent Application No. PCT/EP2016/052616.
Jun. 20, 2019 Office Action issued in Korean Patent Application No. 10-2018-7026070.
First Office Action dated Jul. 12, 2021 corresponding to Chinese Patent Application No. 201680083955.5, with English summary.

\* cited by examiner

RESOURCE PLACEMENT CONTROL IN NETWORK VIRTUALIZATION SCENARIOS

FIELD

The present invention relates to resource placement control in network virtualization scenarios. More specifically, the present invention exemplarily relates to measures (including methods, apparatuses and computer program products) for realizing resource placement control in network virtualization scenarios, and much more specifically cooperative resource placement control in such scenarios.

BACKGROUND

The present specification generally relates to network functions virtualization (NFV).

In NFV, virtualized network functions (VNF) are software implementations of network functions that can be deployed on a network functions virtualization infrastructure (NFVI).

NFVI is the totality of all hardware and software components that build the environment where VNFs are deployed and can span several locations.

Each VNF is managed by a VNF manager (VNFM). A VNFM may for example determine specific resources needed by a certain VNF when a VNF is instantiated (i.e. built) or altered. Part of such determination may be to consider placement constraints.

In such scenario, however, the actual responsibility on where VNFs or their components are placed in the NFVI is with the NFV orchestrator (NFVO).

The NFVO is an entity that has the overview of the available, actually used and reserved resources in a multi-VNF environment and is finally responsible for decisions about resource allocation and placement.

Accordingly, according to present approaches, two architectural building blocks cooperate for resource allocation for VNFs, namely the VNFM and the NFVO.

In a direct resource management mode of operation, it is the responsibility of the VNFM to allocate needed virtualized resources (compute, i.e. processor, storage, networking) from a virtualized infrastructure manager (VIM) when creating (instantiating) a VNF, scaling a VNF, or performing other VNF lifecycle management operations (configurations) that consume virtualized resources. A VIM is an entity in the network functions virtualization scenario managing a set of existing resources.

In an indirect resource management mode of operation, the VNFM invokes the resource allocation operations towards the NFVO which can forward them to the appropriate VIM.

In both modes, it is the responsibility of the NFVO to manage the overall virtualized resources capacity, which includes to decide in which isolated parts of the cloud (mentioned as availability zones) and under which VIMs a particular resource is placed. Such placement cannot be done freely by the NFVO, because essential properties of a VNF (such as performance or fault tolerance) depend on the placement of resources in an appropriate part of the cloud.

For example, it may be necessary to place VNFs in certain parts of the cloud, e.g., close to one another for high performance. As another example, it may be necessary to place VNFs in independent isolated parts of the cloud for fault tolerance.

That is, constraints for virtualized resource placement are implemented cooperatively by the VNFM and the NFVO.

It is known that the VNF vendor may decide on constraints, which control such placement, during VNF design. Such constraints may be statically defined in a VNF descriptor. The VNF descriptor is a set of metadata that is read by the NFVO when a VNF package is loaded into the system (i.e., is on-boarded).

However, it is conceivable that such constraints may change dynamically during lifetime of the VNF.

The declarative approach of the VNF descriptor described above, however, may not be expressive enough to cover constraints that pertain to concrete conditions occurring at runtime. Further, foreseeing such situations in a declarative description may be much more complex than considering them at runtime.

Hence, the problem arises that constraints occurring at runtime are not considered appropriately.

Besides the concept of static constraints in VNF descriptor, or as an extension thereof, an approach is imaginable according to which the NFVO basically delegates the placement decision to the VNFM by providing a list of availability zones and VIMs that the VNFM then uses to decide which resource is placed where.

Further, a static model for defining the placement of virtual systems (known as virtual machines (VM)) to achieve either availability (i.e. separated placement) or affinity (i.e. co-located placement) is known. However, just like with the concept of static constraints in VNF descriptor, the static model uses static placement information, and considers physical hardware entities of a cloud such as site, rack, and chassis. The static placement information in the descriptor may also use a logical entity, like AZ or VIM.

Additionally, a known architecture named OpenStack defines affinity/anti-affinity rules for virtual machines based on a ServerGroupAffinity/ServerGroupAntiAffinity filter.

None of the above-mentioned concepts consider the possibility of jointly making placement decisions by an entity with local management responsibility and an entity with global management responsibility based on of constraints occurring at runtime.

Hence, the problem arises that constraints generated/defined according to present techniques may not fit the actual requirements of a VNF. Namely, requirements of such VNF may unforeseenly change over the lifetime of the VNF. Considering these changes is according to known techniques, if ever, only achievable by crafting and utilizing a language that prepared for expressing rules that cover every possible aspect influencing the requirements of a VNF.

Particularly, in NFV two management entities are intended to handle placement constraints for VNFs. Although the NFVO is actually responsible for the placement of VNF-related resources in the end, some of the placement constraint are only known by the VNFM. Namely, as an example, some placement constraints may depend on current parameters or certain conditions during runtime. These parameters (and the constraints depending on these parameters) are only available for the VNFM.

Hence, there is a need to provide for resource placement control in network virtualization scenarios and in particular for cooperative resource placement control in network functions virtualization environments.

SUMMARY

Various exemplary embodiments of the present invention aim at addressing at least part of the above issues and/or problems and drawbacks.

Various aspects of exemplary embodiments of the present invention are set out in the appended claims.

According to an exemplary aspect of the present invention, there is provided a method in a network virtualization scenario, comprising determining, by a first network entity managing a virtualized network function, constraints related to said virtualized network function, transmitting, by said first network entity, information indicative of said constraints to a second network entity managing resource capacity in said network virtualization scenario, and deciding, by said second network entity, resources or resource capacity to be allocated for said virtualized network function, based on said information indicative of said constraints.

According to an exemplary aspect of the present invention, there is provided a system in a network virtualization scenario, comprising a first network entity managing a virtualized network function, and a second network entity managing resource capacity in said network virtualization scenario, wherein said first network entity is configured to determine constraints related to said virtualized network function, and to transmit information indicative of said constraints to said second network entity, and said second network entity is configured to decide resources or resource capacity to be allocated for said virtualized network function, based on said information indicative of said constraints.

According to an exemplary aspect of the present invention, there is provided an apparatus in a network virtualization scenario for managing a virtualized network function, comprising determining means configured to determine constraints related to said virtualized network function, and transmitting means configured to transmit information indicative of said constraints.

According to an exemplary aspect of the present invention, there is provided an apparatus in a network virtualization scenario for managing resource capacity in said network virtualization scenario, comprising receiving means configured to receive information indicative of constraints related to a virtualized network function, and deciding means configured to decide resources or resource capacity to be allocated for said virtualized network function, based on said information indicative of said constraints.

According to an exemplary aspect of the present invention, there is provided an apparatus in a network virtualization scenario for managing a virtualized network function, comprising at least one processor, at least one memory including computer program code, and at least one interface configured for communication with at least another apparatus, the at least one processor, with the at least one memory and the computer program code, being configured to cause the apparatus to perform: determining constraints related to said virtualized network function, and transmitting information indicative of said constraints.

According to an exemplary aspect of the present invention, there is provided an apparatus in a network virtualization scenario for managing resource capacity in said network virtualization scenario, comprising at least one processor, at least one memory including computer program code, and at least one interface configured for communication with at least another apparatus, the at least one processor, with the at least one memory and the computer program code, being configured to cause the apparatus to perform: receiving information indicative of constraints related to a virtualized network function, and deciding resources or resource capacity to be allocated for said virtualized network function, based on said information indicative of said constraints.

According to an exemplary aspect of the present invention, there is provided a computer program product comprising computer-executable computer program code which, when the program is run on a computer (e.g. a computer of an apparatus according to any one of the aforementioned apparatus-related exemplary aspects of the present invention), is configured to cause the computer to carry out the method according to any one of the aforementioned method-related exemplary aspects of the present invention.

Such computer program product may comprise (or be embodied) a (tangible) computer-readable (storage) medium or the like on which the computer-executable computer program code is stored, and/or the program may be directly loadable into an internal memory of the computer or a processor thereof.

Any one of the above aspects enables at least one of the following:

The constraint language can be kept much simpler, since the VNFM can refer to actually existing, allocated resources.

There is no need to craft a complex language that is prepared for expressing rules that cover every possible aspect influencing the allocation of the Virtualization Containers (e.g. VMs) powering VNF components (VNFC) to the various structural elements of a VIM (typically Infrastructures as a Service (IaaS) cloud). For example, certain aspects such as round-robin allocation of active/standby components to a pair of availability zones can be achieved with this approach very easily, but would require complex constructs in the static, declarative approach.

Constraints can be computed by the VNFM at runtime based on VNF specific rules and VNF specific, current information. This approach gives a large degree of flexibility for handling such constraints, since these do not need to be fixed in a specification that has high cost and long time to change (while a possibly incomplete specification may prevent innovation, hence possibly preventing more efficient applications), and since the actual workload processed by VMs powering the VNFCs (i.e. their fulfilled roles) can change over runtime in order to optimize performance and efficiency. With the advent of containerization, such advanced highly efficient VNFs may become more prevalent. In these architectures, the VMs can become simple placeholders where the real workload processing takes place in flexibly, on-demand scheduled containers.

Accordingly, any one of the above aspects thereby solves at least part of the problems and drawbacks identified in relation to the prior art.

By way of exemplary embodiments of the present invention, there is provided resource placement control in network virtualization scenarios. More specifically, by way of exemplary embodiments of the present invention, there are provided measures and mechanisms for realizing resource placement control in network virtualization scenarios, and in particular for realizing cooperative resource placement control considering that in such network virtualization scenarios a management entity is involved that has local responsibility for the management of a network function and another management entity is involved that has global responsibility for resource capacity management of the whole system. In other words, by way of exemplary embodiments of the present invention, there are provided measures and mechanisms for realizing cooperation of at least two network entities having different responsibilities, as discussed in more detail below.

Thus, improvement is achieved by methods, apparatuses and computer program products enabling/realizing resource placement control in network virtualization scenarios.

BRIEF DESCRIPTION OF THE DRAWINGS

In the following, the present invention will be described in greater detail by way of non-limiting examples with reference to the accompanying drawings, in which.

DETAILED DESCRIPTION OF DRAWINGS AND EMBODIMENTS OF THE PRESENT INVENTION

Figure 1:
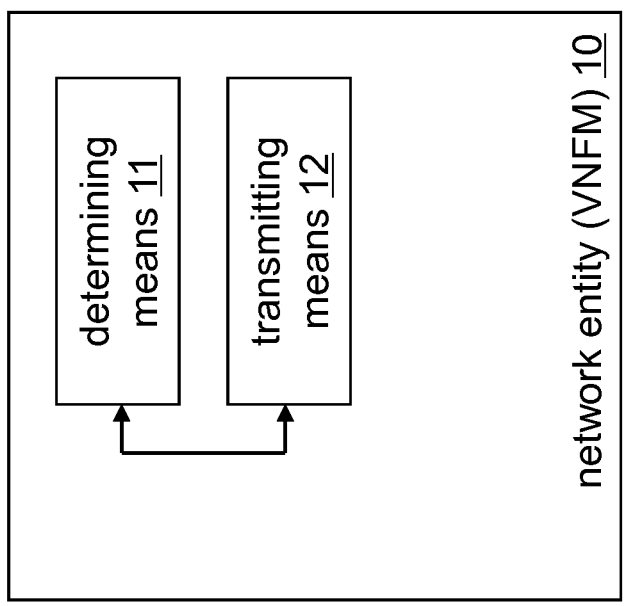
FIG. 1 is a block diagram illustrating an apparatus according to exemplary embodiments of the present invention.

The present invention is described herein with reference to particular non-limiting examples and to what are presently considered to be conceivable embodiments of the present invention. A person skilled in the art will appreciate that the invention is by no means limited to these examples, and may be more broadly applied.

It is to be noted that the following description of the present invention and its embodiments mainly refers to specifications being used as non-limiting examples for certain exemplary network configurations and deployments. Namely, the present invention and its embodiments are mainly described in relation to ETSI Network Functions Virtualization (NFV) specifications being used as non-limiting examples for certain exemplary network configurations and deployments. As such, the description of exemplary embodiments given herein specifically refers to terminology which is directly related thereto. Such terminology is only used in the context of the presented non-limiting examples, and does naturally not limit the invention in any way. Rather, any other communication or communication related system deployment, etc. may also be utilized as long as compliant with the features described herein.

In particular, the present invention and its embodiments may be applicable in any network compound in which virtual network functions are utilized and managed.

Hereinafter, various embodiments and implementations of the present invention and its aspects or embodiments are described using several variants and/or alternatives. It is generally noted that, according to certain needs and constraints, all of the described variants and/or alternatives may be provided alone or in any conceivable combination (also including combinations of individual features of the various variants and/or alternatives).

According to exemplary embodiments of the present invention, in general terms, there are provided measures and mechanisms for (enabling/realizing) resource placement control in network virtualization scenarios, in particular in a cooperative manner.

This invention addresses the problem how constraints for virtualized resource placement can be cooperatively enforced by two management entities, namely, one that is focusing on managing a particular virtualized network element (typically the VNFM), and one that has the overview of the available and actually used resources in a multi-VNF environment, and that is responsible for deciding about resource allocation and placement (typically the NFVO).

The VNFM manages the VNF lifecycle, and therefore determines the resource needs of the VNF during VNF lifecycle management operations. As part of such determination, the VNFM can derive placement constraints for the VNF resources dynamically. Some of these constraints may depend on actual parameters or other conditions that become only available at runtime, and therefore can only be calculated by the VNFM as part of the lifecycle management operation. The VNFM needs to communicate these constraints to the NFVO which needs to consider them in the placement decision.

Hence, according to the present invention, it is proposed to provide for a suitable interface between the management entity focusing on managing a particular virtualized network element and the management entity having the overview of the available, reserved and actually used resources in a multi-VNF environment and being responsible for deciding about resource allocation and placement.

Hence, according to the present invention, it is proposed to provide for a suitable interface between the VNFM and the NFVO.

According to exemplary embodiments of the present invention, it is proposed to enhance the Lifecycle Operation Granting interface between VNFM and NFVO.

FIG. 1 is a block diagram illustrating an apparatus in a network virtualization scenario for managing a virtualized network function according to exemplary embodiments of the present invention. The apparatus may be a network entity 10 such as a VNFM comprising a determining means 11 and a transmitting means 12. The determining means 11 determines constraints related to said virtualized network function. The transmitting means 12 transmits information indicative of said constraints.

Figure 2:
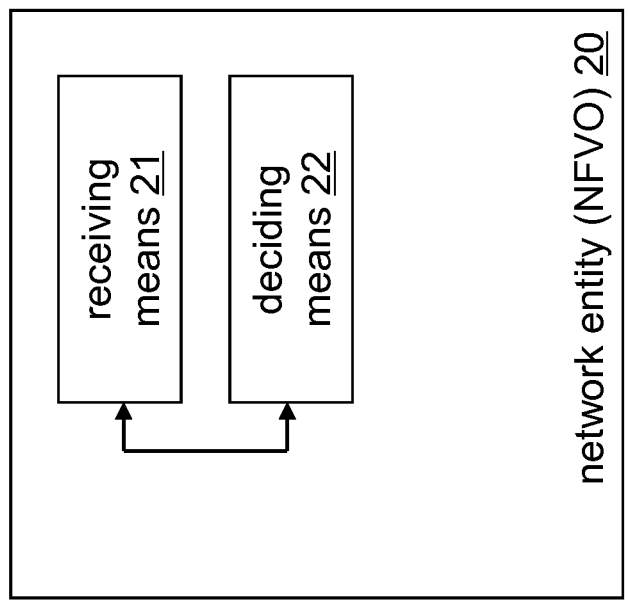
FIG. 2 is a block diagram illustrating an apparatus according to exemplary embodiments of the present invention.

FIG. 2 is a block diagram illustrating an apparatus in a network virtualization scenario for deciding about resource allocation (and for managing resource capacity) in said network virtualization scenario according to exemplary embodiments of the present invention. The apparatus may be a network entity 20 such as a NFVO comprising a receiving means 21 and a deciding means 22. The receiving means 11 receives information indicative of constraints related to a virtualized network function. The deciding means 22 decides resources or resource capacity to be allocated for said virtualized network function based on said information indicative of said constraints.

In an embodiment at least some of the functionalities of the apparatus shown in FIG. 1 and/or of the apparatus shown in FIG. 2 may be shared between two (or more) physically separate devices forming one operational entity. Therefore, the apparatus may be seen to depict the operational entity comprising one or more physically separate devices for executing at least some of the described processes.

Figure 7:
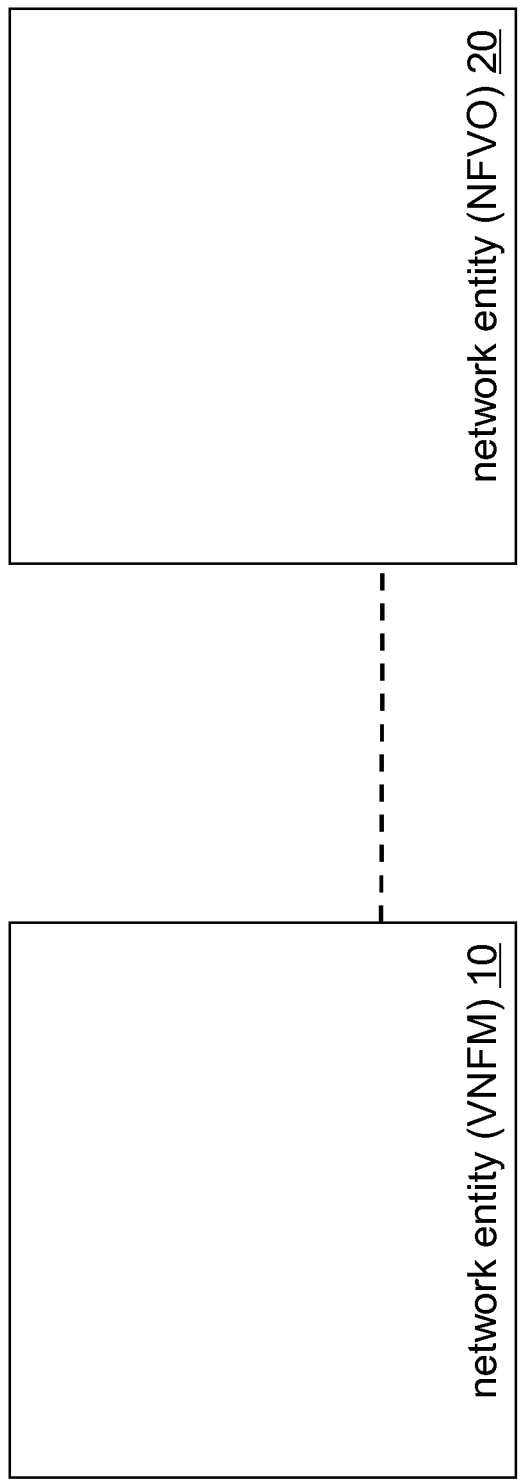
FIG. 7 is a block diagram illustrating a system according to exemplary embodiments of the present invention.

FIG. 7 is a block diagram illustrating a system in a network virtualization scenario according to exemplary embodiments of the present invention. The system comprises a first network entity 10 managing a virtualized network function and a second network entity 20 managing resource capacity and deciding about resource allocation in said network virtualization scenario. The first network entity 10 according to FIG. 7 may be an apparatus (i.e. VNFM) 10 as described in relation to FIG. 1 but is not limited to this apparatus. The apparatus (i.e. VNFM) 10 as described in relation to FIG. 1 may be part of the system as described in relation to FIG. 7 but is not limited to that. Further, the second network entity 20 according to FIG. 7 may be an apparatus (i.e. NFVO) 20 as described in relation to FIG. 2 but is not limited to this apparatus. The apparatus (i.e. NFVO) 20 as described in relation to FIG. 2 may be part of the system as described in relation to FIG. 7 but is not limited to that.

According to exemplary embodiments of the present invention, in the system illustrated in FIG. 7, the first network entity 10 determines constraints related to said virtualized network function. Further, the first network entity 10 transmits information indicative of said constraints to the second network entity 20. The second network entity 20 decides resources or resource capacity to be allocated for said virtualized network function, based on the information indicative of said constraints.

Figure 3:
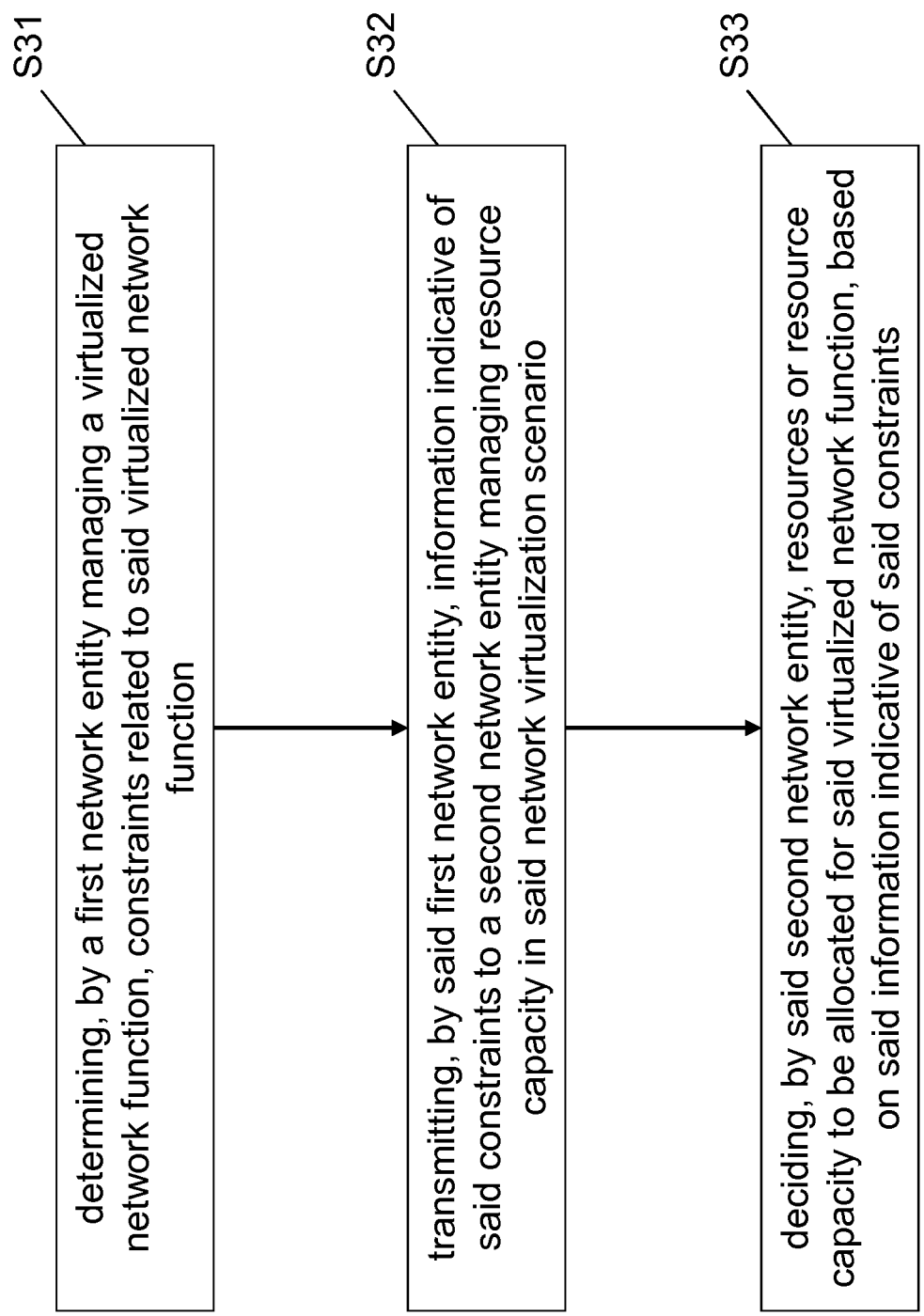
FIG. 3 is a schematic diagram of a procedure according to exemplary embodiments of the present invention.

FIG. 3 is a schematic diagram of a procedure in a network virtualization scenario according to exemplary embodiments of the present invention. The system according to FIG. 7 may perform the method of FIG. 3 but is not limited to this method. The method of FIG. 3 may be performed by the system of FIG. 7 but is not limited to being performed by this apparatus.

As shown in FIG. 3, a procedure according to exemplary embodiments of the present invention comprises an operation of determining (S31), by a first network entity managing a virtualized network function, constraints related to said virtualized network function, an operation of transmitting (S32), by said first network entity, information indicative of said constraints to a second network entity managing resource capacity in said network virtualization scenario, and an operation of deciding (S33), by said second network entity, about resources or resource capacity to be allocated for said virtualized network function, based on said information indicative of said constraints.

Figure 4A:
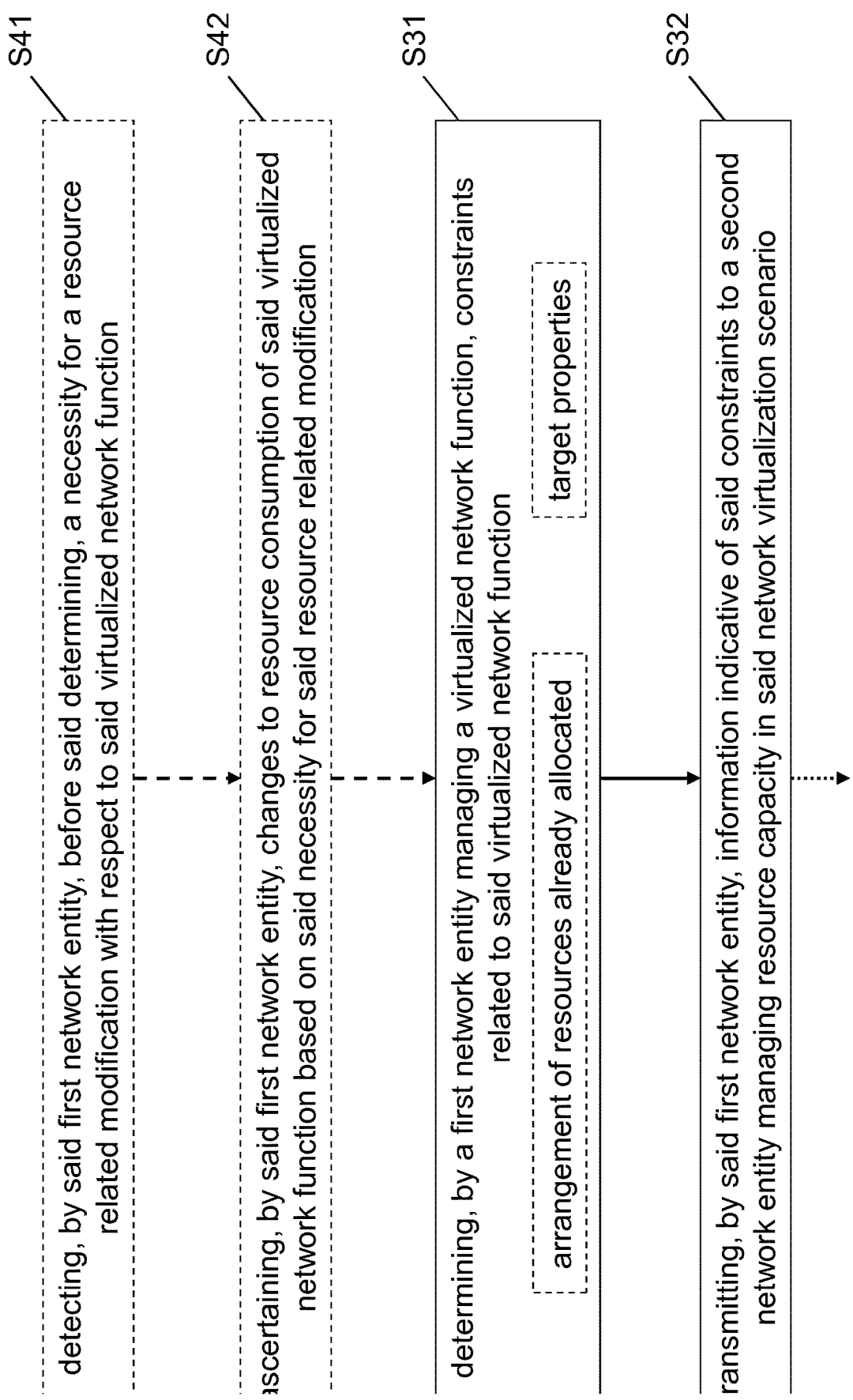
FIGS. 4a and 4b are a schematic diagram of a procedure according to exemplary embodiments of the present invention.
Figure 4B:
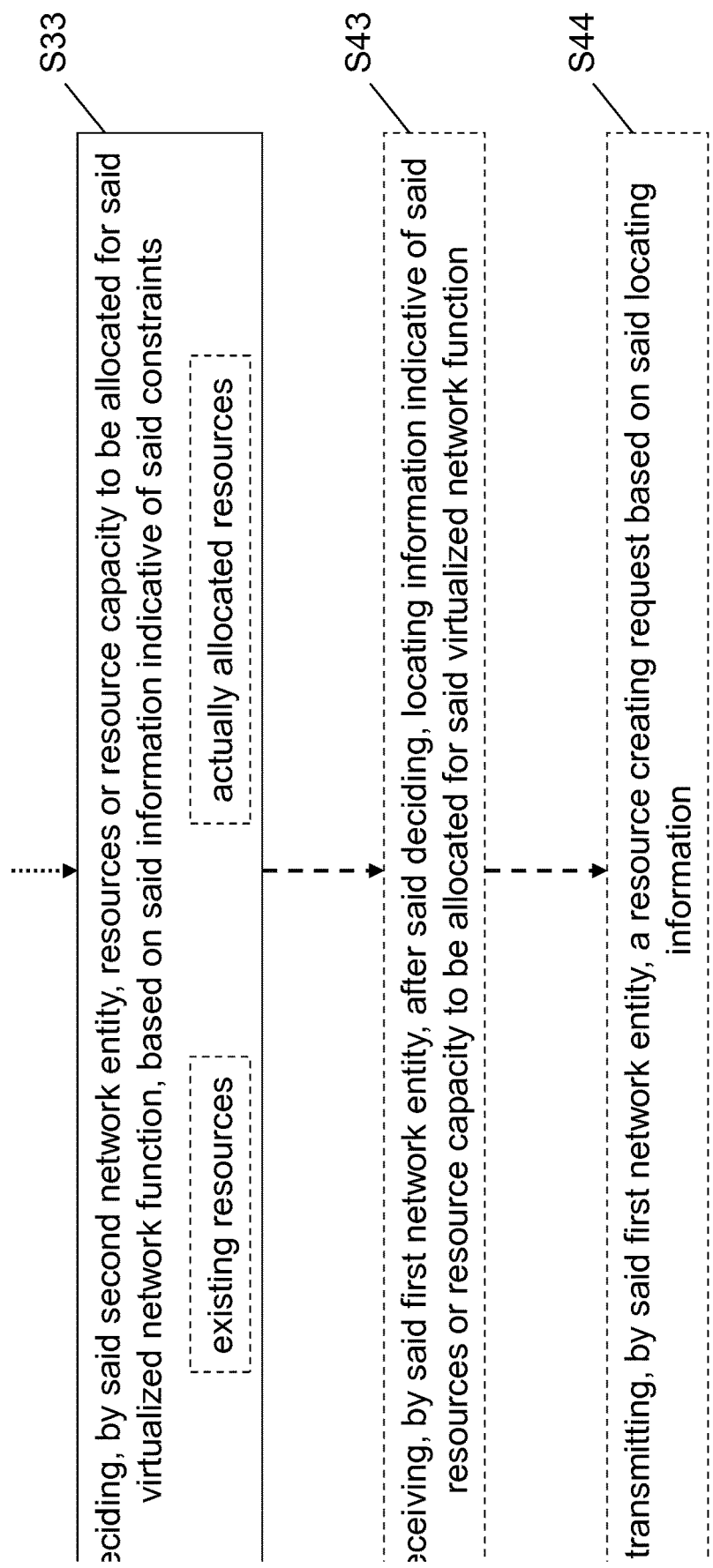

FIGS. 4a and 4b are a schematic diagram of a procedure according to exemplary embodiments of the present invention. In particular, in FIGS. 4a and 4b, exemplary details of operations illustrated in FIG. 3 and exemplary additional operations are given, which are inherently independent from each other as such. That is, exemplary embodiments of the present invention may implement all or only some of the modifications illustrated and explained with respect to FIGS. 4a and 4b. With respect to these two Figures, it is mentioned that the lower arrow in FIG. 4a and the upper arrow in FIG. 4b respectively represent a transition from the procedural step S32 shown in FIG. 4a to the procedural step S33 shown in FIG. 4b corresponding to the transition illustrated in FIG. 3.

As shown in FIG. 4a, according to a variation of the procedure shown in FIG. 3, exemplary additional operations are given, which are inherently independent from each other as such. According to such variation, an exemplary method according to exemplary embodiments of the present invention may comprise an operation of detecting (S41), by said first network entity, before said determining (S31), a necessity for a resource related modification with respect to said virtualized network function, and an operation of ascertaining (S42), by said first network entity, changes to resource consumption of said virtualized network function based on said necessity for said resource related modification.

Namely, in more specific terms, according to exemplary embodiments of the present invention, such resource related modification may be identified as lifecycle management of a virtualized network function, which may mean a modification of the amount of virtualization resources used by the virtualized network function. In other words, the amount of resources allocated to the virtualized network function is changed. This may include going from using zero resources to using some resources (called instantiation), varying used resources (example operations are scaling, healing), and going from using some resources to using zero resources (called termination).

As further shown in FIG. 4a, according to a variation of the procedure shown in FIG. 3, exemplary details of the determining operation (S31) are given, which are inherently independent from each other as such.

In such exemplary determining operation (S31) according to exemplary embodiments of the present invention, an arrangement of resources already allocated to said virtualized network function may be considered.

Further, in such exemplary determining operation (S31) according to exemplary embodiments of the present invention, target properties of said virtualized network function may be considered. Here, it is noted that such target properties of a virtualized network function may be the above-mentioned superior requirements (essential properties) like fault tolerance or performance.

As shown in FIG. 4b, according to a variation of the procedure shown in FIG. 3, exemplary details of the deciding operation (S33) are given, which are inherently independent from each other as such.

In such exemplary deciding operation (S33) according to exemplary embodiments of the present invention, resources existing in said network virtualization scenario and resources actually allocated in said network virtualization scenario may be considered.

As an optional modification of the deciding operation (S33) according to further exemplary embodiments of the present invention, resources reserved in said network virtualization scenario may be considered.

As shown in FIG. 4b, according to a variation of the procedure shown in FIG. 3, exemplary additional operations are given, which are inherently independent from each other as such. According to such variation, an exemplary method according to exemplary embodiments of the present invention may comprise an operation of receiving (S43), by said first network entity, after said deciding (S33), locating information indicative of said resources or resource capacity to be allocated for said virtualized network function, and an operation of transmitting (S44), by said first network entity, a resource creating request based on said locating information. The locating information will be discussed in relation to FIG. 5.

Figure 5:
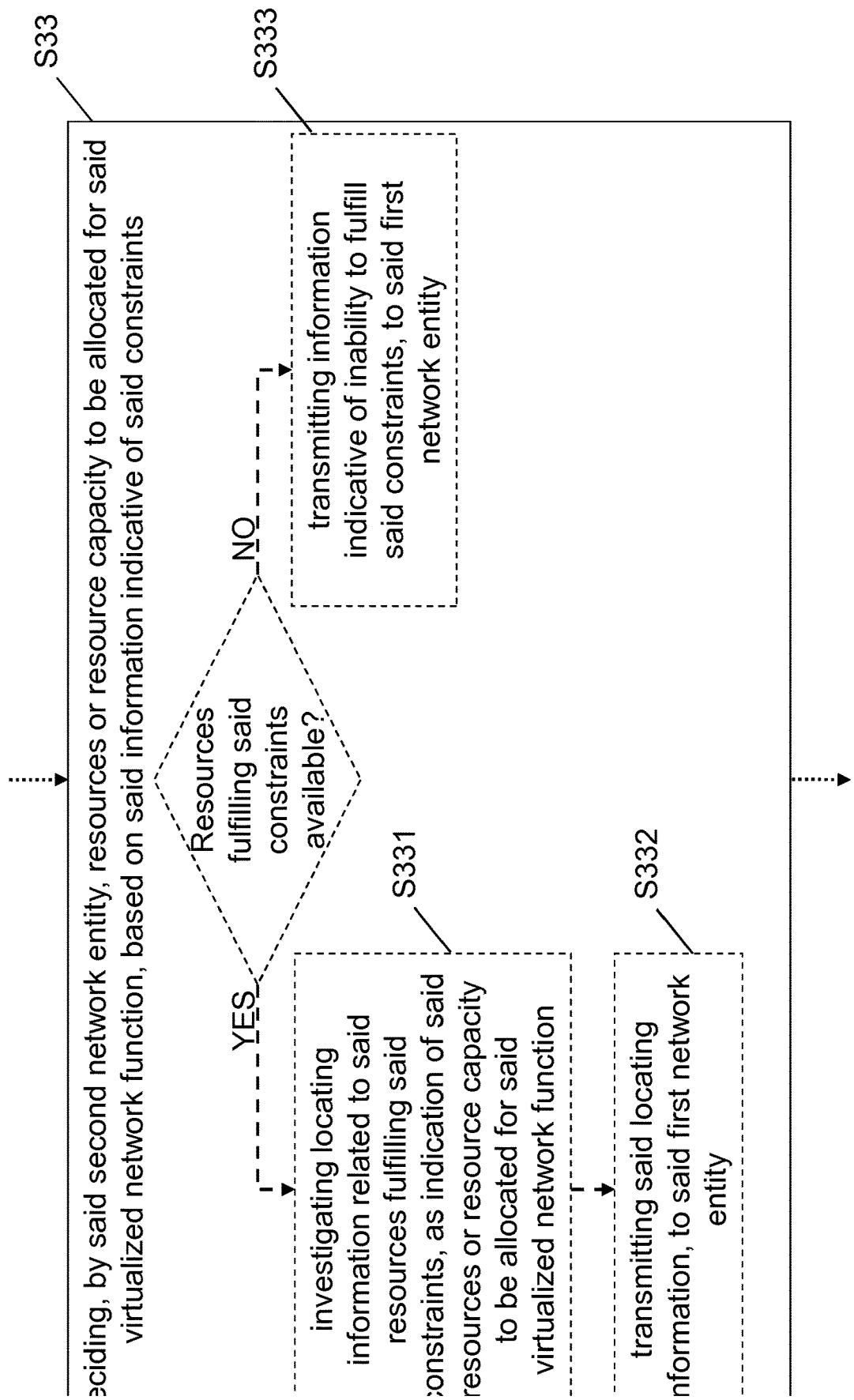
FIG. 5 is a schematic diagram showing modifications of a step of the procedure shown in FIGS. 3, 4a and 4b according to exemplary embodiments of the present invention.

FIG. 5 is a schematic diagram showing modifications of a step of the procedure shown in FIGS. 3, 4a and 4b according to exemplary embodiments of the present invention. In particular, in FIG. 5, exemplary details of the deciding operation (S33) illustrated in FIGS. 3, 4a and 4b are given, which are inherently independent from each other as such. That is, exemplary embodiments of the present invention may implement all or only some of the modifications illustrated and explained with respect to FIG. 5.

As shown in FIG. 5, according to a variation of the procedure shown in FIG. 3, such exemplary deciding operation (S33) according to exemplary embodiments of the present invention may comprise an operation of investigating (S331), by said second network entity, if resources fulfilling said constraints are available, locating information related to said resources fulfilling said constraints, as indication of said resources or resource capacity to be allocated for said virtualized network function, and an operation of transmitting (S332), by said second network entity, said locating information, to said first network entity.

That is, it is checked whether resources fulfilling the constraints are available. If this is the case, the second network entity (e.g. NFVO) indicates to the first network entity (e.g. VNFM) that it can allocate the requested amount of resources, or can allocate particular resources. However, the first network entity does not only detect whether resources fulfilling the constraints are available but also the counterpart which the first network entity has to address for the investigated resource capacity (e.g. VIM). Based on this locating information, the first network entity may address e.g. the correct VIM for requesting resources.

According to further exemplary embodiments of the present invention, before said transmitting, an exemplary method may comprise an operation of reserving, by said second network entity, said resources or resource capacity to be allocated for said virtualized network function.

In this regard, at least two options are possible according to exemplary embodiments of the present invention.

Namely, on the one hand, the reserving may be effected subsequent to said investigating and based on the result of the investigating. Here, a scenario is exemplarily mentioned in which the first network entity transmits constraints in the course of a scaling operation, the second network entity investigates locating information related to resources fulfilling the constraints, and thereafter reserves resources or resource capacity to be allocated.

However, on the other hand, the reserving may be effected prior to the investigating in the course of a respective resource related modification with respect to the virtualized network function (i.e. lifecycle management operation). Here, a scenario is exemplarily mentioned in which reserving of a big chunk of resources is done subsequently to an investigating for a foregoing instantiation operation (going from using zero resources to using some resources). If the first network entity transmits constraints in the course of a subsequent scaling operation, the second network entity investigates locating information related to resources fulfilling the constraints, while resources from the already reserved chunk are used without the need for a new reservation.

Further, as shown in FIG. 5, according to a variation of the procedure shown in FIG. 3, such exemplary deciding operation (S33) according to exemplary embodiments of the present invention may comprise an operation of transmitting (S333), by said second network entity, if no resources fulfilling said constraints are available, information indicative of inability to fulfill said constraints, to said first network entity.

That is, as shown in FIG. 5, according to a variation of the procedure shown in FIG. 3, it may be checked by said second network entity whether resources fulfilling said constraints are available, and the deciding operation (S33) may depend on the result of such checking.

As discussed in more detail later on, according to exemplary embodiments of the present invention, the information indicative of said constraints may be transmitted (S32) as a portion of a granting request. Furthermore, and in particular in such case, according to exemplary embodiments of the present invention, the above-mentioned locating information may be transmitted (S332) to the first network entity as a portion of a granting response.

Further, according to exemplary embodiments of the present invention, the constraints may be placement constraints constraining a placement of said resources to be allocated.

In addition, according to exemplary embodiments of the present invention, the constraints may comprise at least one of an availability zone, an availability zone group including at least one availability zone, a virtualized infrastructure manager managing a set of said resources in said network virtualization scenario, a host physically providing a portion of said resources in said network virtualization scenario, and a resource location specific to a certain implementation.

According to further exemplary embodiments of the present invention, if said constraints comprise an availability zone group including a first availability zone and a second availability zone related to each other and if resources already allocated to said virtualized network function are associated with said first availability zone, in relation to said deciding, resources associated with said second availability zone may be considered.

In other words, according to exemplary embodiments of the present invention, a concept of AZ groups is proposed. An AZ group is a group of related zones, where the second network entity can instruct resource allocation in another AZ than the one in which related resources are allocated.

In other words, according to exemplary embodiments of the present invention, the VNFM communicates actual placement constraints to the NFVO.

According to preferred exemplary embodiments, the VNFM communicates actual placement constraints to the NFVO as an extension of a granting exchange, in particular, as an extension of a granting request. More specifically, according to exemplary embodiments, the forwarding of the placement constraints from the VNFM to the NFVO may be implemented by an additional parameter in the granting request. However, as already mentioned above, the present invention is not limited thereto, and a communication of constraints may also take place independently from the granting exchange and the corresponding messages (e.g. request).

The granting exchange is an exchange of request and response messages between VNFM and NFVO that takes place when the VNFM starts to perform a lifecycle management operation (change of resources allocated to the VNF, e.g. related to instantiation, scaling, healing, termination) for a VNF, but before any actual resource allocation is done. In other words, granting must be invoked by the VNFM each time a VNF is altered (or instantiated).

Such lifecycle management operation can be performed based on requests received by connected functional blocks, based on operations personnel input or by automatic logic programmed in the VNFM. In the granting request, the VNFM informs the NFVO of the upcoming lifecycle management operation (configuration) and of the foreseen changes to the resource consumption (add resources, delete resources, change resources) of the considered VNF.

In particular, according to exemplary embodiments of the present invention, the list of foreseen resource additions is enriched with constraints that restrict the placement of these resources, such that the VNFM can enforce certain properties of the VNF such as performance or fault tolerance which were defined at design time or are to be fulfilled based on the runtime status valid at time when the granting exchange takes place.

According to this concept, the NFVO is obliged to honor (at least consider) the constraints provided by the VNFM.

Figure 6:
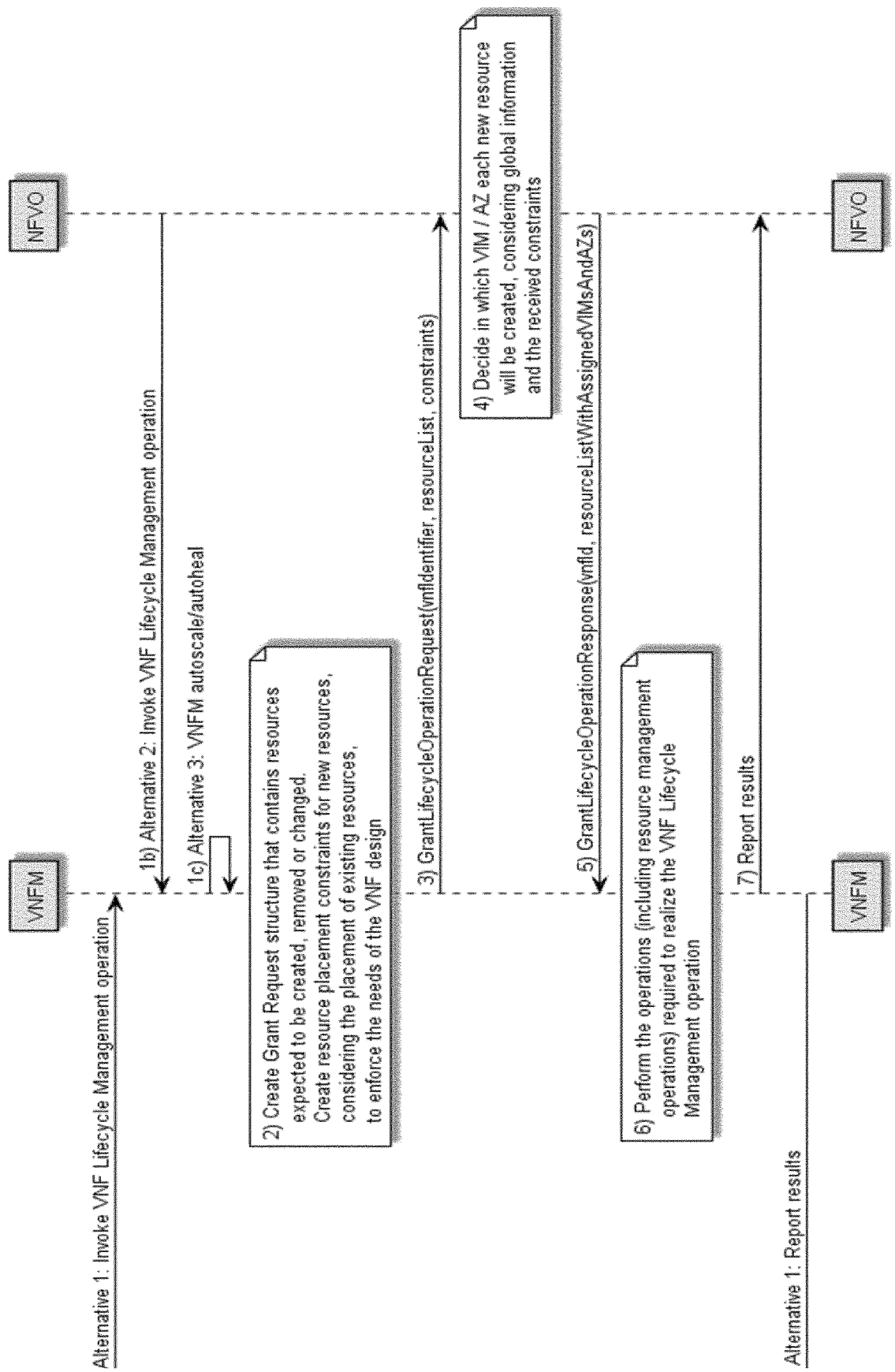
FIG. 6 shows a schematic diagram of an example of a system environment with signaling variants according to exemplary embodiments of the present invention.

FIG. 6 shows a schematic diagram of an example of a system environment with signaling variants according to exemplary embodiments of the present invention. A signaling illustrated in FIG. 6 and described below may be implemented by a system as discussed in relation to FIG. 7 and a corresponding method discussed in relation to FIGS. 3, 4a, 4b and 5.

In particular, FIG. 6 illustrates a preferred embodiment of the present invention.

As shown in FIG. 6, in a first step, the VNFM receives a request to manage the lifecycle of a VNF (e.g. instantiate, scale, heal, update, etc.). This request may be received from the NFVO (alternative 2) or from a third entity (alternative 1) such as an element manager (EM). Alternatively, the VNFM itself decides (alternative 3) on a lifecycle management (LCM) operation, e.g., to scale a VNF or to heal a VNF (VNFM auto-scale or auto-heal functionality).

In a second step of FIG. 6, the VNFM plans the changes to the resource consumption (add, delete, change) and creates the constraints for the resource placement. In particular, the VNFM creates a grant request structure that contains resources expected to be created, removed, or changed. Further, the VNFM creates resource placement constraints for new resources under consideration of the placement of existing resources to enforce the needs of the VNF design.

In a third step of FIG. 6, the VNFM sends this information (result of plans/creations) in a GrantLifecycleOperation request to the NFVO.

In a fourth step of FIG. 6, the NFVO decides based on its global knowledge and based on the constraints, in which VIMs and AZs the new resources shall be allocated.

In a fifth step of FIG. 6, the NFVO passes this information (result of decision) back to the VNFM in the GrantLifecycleOperation response. Alternatively, if the constraints cannot be met, the NFVO returns appropriate error information.

In a sixth step of FIG. 6, the VNFM invokes resource creation requests towards the VIMs returned in the response. In particular, the NFVO instructs the decided VIMs to create the resources in the appropriate availability zones returned in the response. The VNFM may perform further operations to fulfil the lifecycle management request received in the first step of FIG. 6.

In a seventh step of FIG. 6, the VNFM reports success (or failure) to the NFVO once the lifecycle management operation is finalized.

In case of alternative 1 in the first step of FIG. 6 (i.e. request received from a third entity), in an eighth step of FIG. 6, the VNFM reports success (or failure) to the third entity (e.g. EM).

In the following, a compilation of types of constraining locations is presented, which are applicable to the above discussed exemplary embodiments of the present invention. It is to be noted that the present invention is not limited to the presented types of constraining locations, but different types of locations (in a cloud-based system) are conceivable as well. In particular, additional constrainable location types that arise from evolution of existing cloud structures that provide equally suitable mechanisms to influence the resource placement decisions are conceivable and do not deviate from embodiments of the present invention.

Availability zone (AZ): A constraint can constrain a resource to a particular AZ. This assumes that AZs are elastic constructs that can grow with demand. Otherwise, an AZ may be full at some point in time. AZ constraints limit the selection of the AZ in which a new resource shall be allocated.

Availability zone group: A constraint can constrain a resource to a particular group of related availability zones. This supports the case of AZs that have static size (i.e. are not elastic), and allows handling AZ overflows into other AZs of the same group (these are usually close by each other and connected with high network performance). This allows a resource to be allocated in one AZ of a group of related AZs, rather than enforcing to allocate them in the same AZ. AZ group constraints limit the selection of the AZ group in which a new resource shall be allocated.

Virtualized infrastructure manager (VIM): A constraint can constrain a resource to a particular VIM. This supports the case that the resources of a VNF can be managed by more than one VIM. VIM constraints limit the selection of the VIM by which a new resource will be managed.

Host: A constraint can constrain a (compute or storage) resource to a particular physical host. This allows to co-locate resources on the same physical host for enhanced performance, or to locate resources on different hosts for enhanced error resilience.

Implementation-specific: A constraint can constrain a resource to a particular location of a type specific to certain implementations or systems. In this regard it is noted that the known architecture named OpenStack for instance provides a concept of regions in addition to availability zones.

Constrainable locations are hierarchical. For the above compilation, at least the following two relationships are considered.

VIM→AZ→host (i.e. VIM superior to AZ superior to host), and VIM→AZ group→host (i.e. VIM superior to AZ group superior to host).

In this regard, it is noted that a symbolic AZ/AZ group/VIM means that the VNFM just assumes that there will be a particular AZ/AZ group/VIM, but the actual instance of the AZ/AZ group/VIM and its place in the cloud is managed by the NFVO and sent to the VNFM in the Grant response.

It is further noted that in European Telecommunications Standards Institute (ETSI) NFV, the more general term resource zone is used instead of availability zone. That is, the term availability zone used herein may correspond to the term resource zone defined in the ETSI NFV, but may also deviate therefrom.

It is further noted that a hierarchy VIM→AZ group→AZ→host (i.e. VIM superior to AZ group superior to AZ superior to host) can be formulated, too, but such hierarchy makes only limited sense. Namely, it is assumed that in common cases, either elastic AZs or AZ groups are used, but not both. However, the mentioned hierarchy is not excluded.

It is further noted that implementation-specific locations as well as hereinbefore unmentioned types of locations conceivable in a cloud-based system may also be part of a hierarchy in a particular embodiment.

In the following, a compilation of types of constraints is presented, which are applicable to the above discussed exemplary embodiments of the present invention. It is to be noted that the present invention is not limited to the presented types of constraints, but different types of constraints (in a cloud-based system) are conceivable as well. In particular, additional constraint types that arise from evolution of existing cloud structures that provide equally suitable mechanisms to influence the resource placement decisions are conceivable and do not deviate from embodiments of the present invention and still fit into the overall framework proposed according to the present invention.

In particular, for each of the constrainable location types, according to exemplary embodiments of the present invention, different actual constraint types can be defined as follows, together with the possible options to signal them in the grant request.

In each constraint type given below, <place> refers to a constrainable location, such as Host, AZ, AZ group, or VIM, as discussed above.

Constraint Type 1:

Symbolic <place>: Declares a symbolic placeholder for each <place>. This allows to design beforehand how to partition of a VNF over a fixed set of constraining locations, and to ask the NFVO to partition it exactly the way it was designed.

According to exemplary embodiments of the present invention, two options are proposed for declaration according to constraint type 1:

Option (a):

Declaring symbolic names for all instances of <place> that are foreseen to be used and referencing them from each description of a new resource (explicit symbolic <place>).

An exemplary statement for constraint type 1, option (a) might be as follows:
declare (VIMs=VIM1, VIM2); (AZs=VIM1.AZ10, VIM1.AZ11,VIM2.AZ23)
placement(VM1, VIM1, AZ10)
placement(VM2, VIM1, (AZ10, AZ11))
placement(VM3, VIM2, AZ23)

Option b:

Tagging each description of a new resource with the symbolic name of a <place>, and assuming that a same tag implies the same <place> (implicit symbolic <place>). The result of this option (b) is like constraint type 1, option (a) but the symbolic names are not declared before they are used, and the hierarchy must be derived from the syntax of the tags (such as VIM1.AZ1).

An exemplary statement for constraint type 1, option (b) might be as follows:
placement(VM1, VIM1.AZ10)
placement(VM2, VIM1.AZ10, VIM1.AZ11)
placement(VM3, VIM2.AZ23)

Constraint Type 2:

Same <place>: One resource is put into the same <place> as others.

According to exemplary embodiments of the present invention, three options are proposed for declaration according to constraint type 2:

Option (a):

Referencing one existing resource that is in the same <place> from each description of a new resource (implicit list).

An exemplary statement for constraint type 2, option (a) might be as follows:
Existing resources=VM0
New resources=VM1, VM2, VM3
samePlace(type=VIM, VM1, VM0)
samePlace(type=AZ, VM2, VM0)
samePlace(type=AZgrp, VM1, VM0)

Here, the first samePlace-line means that VM1 will be in the same VIM as VM0, the second samePlace-line means that VM2 will be in the same AZ as VM0, and the third samePlace-line means that VM1 will be in the same AZ group as VM0, but not necessarily same AZ.

Option (b):

Defining all resources that are intended to be in the same <place> (explicit list). An explicit list (e.g. A,{B,C}) can also be given as a list of pairs (e.g. {{A,B},{A,C}}. Each resource in such list may be either a pre-existing resource, or a resource requested to be added in the same grant request in which the constraint is sent. A pre-existing resource can either be declared in the grant request message, or referenced by an identifier that is known to both the VNFM and the NFVO or that the NFVO can query from the VNFM by using a QueryVNF request.

An exemplary statement for constraint type 2, option (b) might be as follows:
Existing resources=VM0
New resources=VM1, VM2, VM3
samePlace(type=AZ, VM1, VM2, VM0)

Here, the samePlace-line means that VM1, VM2 (and VM0) will be in the same AZ as VM0.

Option (c):

Managing in the NFVO the list of resources that are intended to be in the same <place> (named groups). The underlying concept is known from OpenStack (ServerGroupAffinityFilter). However, according to the present invention, there can be multiple groups, each one for a different constraining location type. A group is created and persisted in the NFVO by an instruction in the grant request, and can be referenced in subsequent grant requests. Each grant request can add new resources to the group.

Two exemplary statements for constraint type 2, option (c) might be as follows:

First Grant Request:
declareSamePlaceGroup(type=VIM, name=sameVIM1)
declareSamePlaceGroup(type=AZ, name=sameAZ1)
newresource(VM0, (sameVIM1, sameAZ1))
newresource(VM1, (sameVIM1))

That is, according to this exemplary first grant request, two groups are declared and persisted at the NFVO, one for resources in the same VIM and one for resources in the same AZ, wherein VM1 and VM0 will be in the same VIM but not necessarily in the same AZ.

Subsequent Grant Request:
newresource(VM2, (sameVIM1, sameAZ1))

That is, according to this exemplary subsequent grant request, VM2 will be in the same VIM and same AZ as VM0 (using information from the first grant request above).

Constraint Type 3:

Different <place>: One resource is put into a different <place> than others. The constraint is defined in analogy to constraint type 2 with the difference that it is not defined by means of a same <place> but by means of a different <place>.

According to exemplary embodiments of the present invention, three options are proposed for declaration according to constraint type 3:

Option (a):

Referencing one existing resource that is in a different <place> from each description of a new resource (implicit list). As this constraint type 3 is defined in analogy to constraint type 2, implementation details of constraint type 3, option (a) are comparable to implementation details of constraint type 2, option (a), in particular with respect to the exemplary statement.

Option (b):

Defining all resources that are intended to be in a different instance of <place> (explicit list). As this constraint type 3 is defined in analogy to constraint type 2, implementation details of constraint type 3, option (b) are comparable to implementation details of constraint type 2, option (b), in particular with respect to the exemplary statement.

Option (c):

Managing in the NFVO the list of resources that are intended to be in a different instance of <place> (named groups). As this constraint type 3 is defined in analogy to constraint type 2, implementation details of constraint type 3, option (c) are comparable to implementation details of constraint type 2, option (c), in particular with respect to the exemplary statement.

For reasons of clarity and unambiguity, measures are proposed which are applicable to the above discussed exemplary embodiments of the present invention. In particular, there is a need to signal the semantics of a particular constraining location type (i.e. VIM, AZ, AZ group, Host) being absent. In other words, there is a need that all involved participants know the result of an undefined constraining location type.

Namely, such absent constraining location type may means, for example, It either that the NFVO is free to do anything (e.g. freely split a VNF among multiple VIMs if there are no VIM constraints given), or the NFVO must not split a VNF with respect to this particular constraining location type (e.g. use the same VIM for all resources if there are no VIM constraints given).

Hence, according to exemplary embodiments of the present invention, suitable defaults for absence (of a particular constraining location type) may be defined. Alternatively, or in addition, it may be globally signaled that particular constraining location types do not apply and all resources need to be allocated in the same <place>.

Two exemplary statements for such a global constraint might be as follows:
globalConstraint(sam eVIM)
globalConstraint(sam eAZgroup)

Here, the first exemplary statement means that it is not acceptable to split a VNF among multiple VIMs. Further, the second exemplary statement means that it is not acceptable to split a VNF among multiple AZ groups.

The above-described procedures and functions may be implemented by respective functional elements, processors, or the like, as described below.

In the foregoing exemplary description of the network entity, only the units that are relevant for understanding the principles of the invention have been described using functional blocks. The network entity may comprise further units that are necessary for its respective operation. However, a description of these units is omitted in this specification. The arrangement of the functional blocks of the devices is not construed to limit the invention, and the functions may be performed by one block or further split into sub-blocks.

When in the foregoing description it is stated that the apparatus, i.e. network entity (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is construed to be equivalent to an expression such as "means for").

Figure 8:
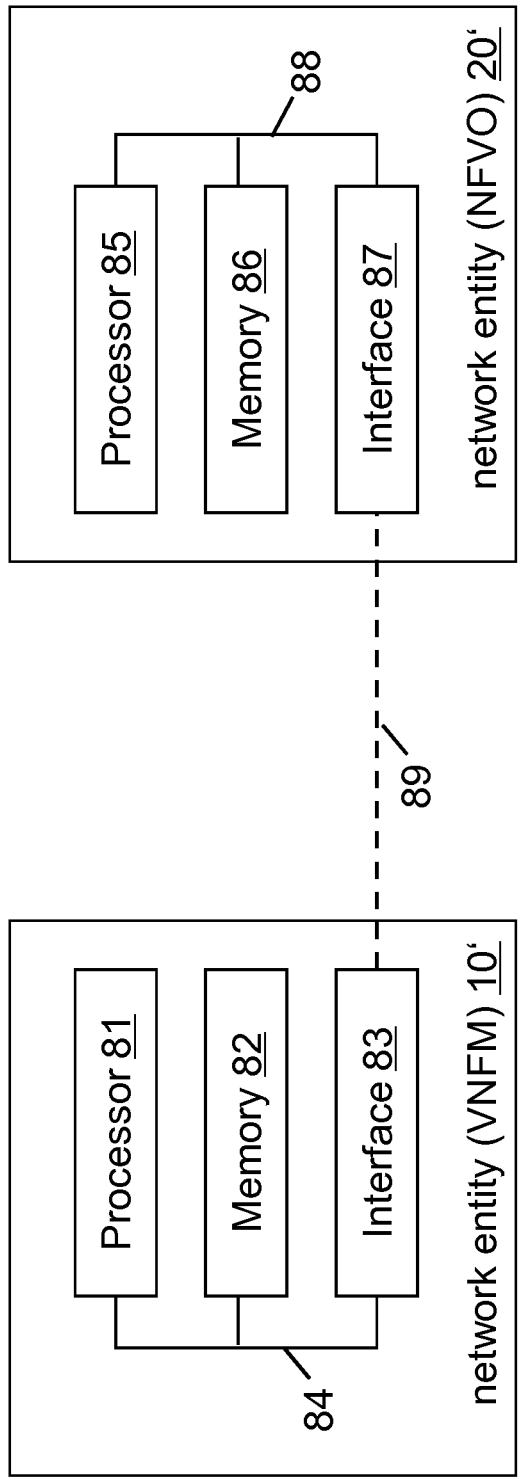
FIG. 8 is a block diagram alternatively illustrating apparatuses according to exemplary embodiments of the present invention.

In FIG. 8, an alternative illustration of apparatuses according to exemplary embodiments of the present invention is depicted. As indicated in FIG. 8, according to exemplary embodiments of the present invention, the apparatus (network entity) 10' (corresponding to the network entity 10) comprises a processor 81, a memory 82 and an interface 83, which are connected by a bus 84 or the like. Further, according to exemplary embodiments of the present invention, the apparatus (network entity) 20' (corresponding to the network entity 20) comprises a processor 85, a memory 86 and an interface 87, which are connected by a bus 88 or the like, and the apparatuses may be connected via link 69, respectively. Connected via link 69, the apparatuses 10' and 20' may form the system described in particular with respect to FIG. 7.

The processor 81/85 and/or the interface 83/87 may also include a modem or the like to facilitate communication over a (hardwire or wireless) link, respectively. The interface 83/87 may include a suitable transceiver coupled to one or more antennas or communication means for (hardwire or wireless) communications with the linked or connected device(s), respectively. The interface 83/87 is generally configured to communicate with at least one other apparatus, i.e. the interface thereof.

While according to the embodiments depicted in FIG. 8 the apparatus corresponding to the network entity 10 and the apparatus corresponding to the network entity 20 are implemented by means of separate processors, memories, and interfaces, according to exemplary embodiments of the present invention, the apparatus corresponding to the network entity 10 and the apparatus corresponding to the network entity 20 may share at least one of processor and the memory. In such case, an interface between these two apparatuses may be suitably implemented.

The memory 82/86 may store respective programs assumed to include program instructions or computer program code that, when executed by the respective processor, enables the respective electronic device or apparatus to operate in accordance with the exemplary embodiments of the present invention.

In general terms, the respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

When in the subsequent description it is stated that the processor (or some other means) is configured to perform some function, this is to be construed to be equivalent to a description stating that at least one processor, potentially in cooperation with computer program code stored in the memory of the respective apparatus, is configured to cause the apparatus to perform at least the thus mentioned function. Also, such function is to be construed to be equivalently implementable by specifically configured means for performing the respective function (i.e. the expression "processor configured to [cause the apparatus to] perform xxx-ing" is construed to be equivalent to an expression such as "means for xxx-ing").

According to exemplary embodiments of the present invention, an apparatus representing the network entity 10 comprises at least one processor 81, at least one memory 82 including computer program code, and at least one interface 83 configured for communication with at least another apparatus. The processor (i.e. the at least one processor 81, with the at least one memory 82 and the computer program code) is configured to perform determining constraints related to said virtualized network function (thus the apparatus comprising corresponding means for determining), and to perform transmitting information indicative of said constraints (thus the apparatus comprising corresponding means for transmitting).

According to further exemplary embodiments of the present invention, an apparatus representing the network entity 20 comprises at least one processor 85, at least one memory 86 including computer program code, and at least one interface 87 configured for communication with at least another apparatus. The processor (i.e. the at least one processor 85, with the at least one memory 86 and the computer program code) is configured to perform receiving information indicative of constraints related to a virtualized network function (thus the apparatus comprising corresponding means for receiving), and to perform deciding resources or resource capacity to be allocated for said virtualized network function based on said information indicative of said constraints (thus the apparatus comprising corresponding means for deciding).

For further details regarding the operability/functionality of the individual apparatuses, reference is made to the above description in connection with any one of FIGS. 1 to 7, respectively.

For the purpose of the present invention as described herein above, it should be noted that

- method steps likely to be implemented as software code portions and being run using a processor at a network server or network entity (as examples of devices, apparatuses and/or modules thereof, or as examples of entities including apparatuses and/or modules therefore), are software code independent and can be specified using any known or future developed programming language as long as the functionality defined by the method steps is preserved;
- generally, any method step is suitable to be implemented as software or by hardware without changing the idea of the embodiments and its modification in terms of the functionality implemented;
- method steps and/or devices, units or means likely to be implemented as hardware components at the above-defined apparatuses, or any module(s) thereof, (e.g., devices carrying out the functions of the apparatuses according to the embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;
- devices, units or means (e.g. the above-defined network entity or network register, or any one of their respective units/means) can be implemented as individual devices, units or means, but this does not exclude that they are implemented in a distributed fashion throughout the system, as long as the functionality of the device, unit or means is preserved;
- an apparatus like the user equipment and the network entity/network register may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;
- a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable.

In view of the above, there are provided measures for resource placement control in network virtualization scenarios. Such measures exemplarily comprise, in a network virtualization scenario, determining, by a first network entity managing a virtualized network function, constraints related to said virtualized network function, transmitting, by said first network entity, information indicative of said constraints to a second network entity managing resource capacity in said network virtualization scenario, and deciding, by said second network entity, resources or resource capacity to be allocated for said virtualized network function, based on said information indicative of said constraints.

Even though the invention is described above with reference to the examples according to the accompanying drawings, it is to be understood that the invention is not restricted thereto. Rather, it is apparent to those skilled in the art that the present invention can be modified in many ways without departing from the scope of the inventive idea as disclosed herein.

LIST OF ACRONYMS AND ABBREVIATIONS

| | |
|---|---|
| 3GPP | 3rd Generation Partnership Project |
| AZ | availability zone |
| EM | element manager |
| ETSI | European Telecommunications Standards Institute |
| IaaS | Infrastructures as a Service |
| LCM | lifecycle management |

-continued

| | |
|---|---|
| NFV | network functions virtualization |
| NFVI | network function virtualization infrastructure |
| NFVO | NFV orchestrator |
| VIM | virtualized infrastructure manager |
| VM | virtual machine |
| VNF | virtualized network function |
| VNFC | VNF component |
| VNFD | VNF descriptor |
| VNFM | VNF manager |

The invention claimed is:

1. A method in a network virtualization scenario, comprising:
    determining, by a first network entity managing a virtualized network function, constraints related to said virtualized network function;
    transmitting, by said first network entity, information indicative of said constraints to a second network entity managing resource capacity in said network virtualization scenario;
    deciding, by said second network entity, resources or resource capacity to be allocated for said virtualized network function, based on said information indicative of said constraints, wherein the deciding comprises investigating, by said second network entity, if resources fulfilling said constraints are available, locating information related to said resources fulfilling said constraints, as indication of said resources or resource capacity to be allocated for said virtualized network function; and
    transmitting, by said second network entity, said locating information, to said first network entity.

2. The method according to claim 1, further comprising:
    detecting, by said first network entity, before said determining, a necessity for a resource related modification with respect to said virtualized network function; and
    ascertaining, by said first network entity, changes to resource consumption of said virtualized network function based on said necessity for said resource related modification.

3. The method according to claim 1, wherein
    in relation to said deciding, said method further comprises
    reserving, by said second network entity, before said transmitting, said resources or resource capacity to be allocated for said virtualized network function.

4. The method according to claim 1, wherein
    in relation to said deciding, said method further comprises
    transmitting, by said second network entity, if no resources fulfilling said constraints are available, information indicative of inability to fulfill said constraints, to said first network entity.

5. The method according to claim 1, further comprising:
    receiving, by said first network entity, after said deciding, locating information indicative of said resources or resource capacity to be allocated for said virtualized network function; and
    transmitting, by said first network entity, a resource creating request based on said locating information.

6. The method according to claim 1, wherein
    said constraints are placement constraints constraining a placement of said resource to be allocated.

7. The method according to claim 1, wherein
    said constraints comprise at least one of an availability zone, an availability zone group including at least one availability zone, a virtualized infrastructure manager managing a set of said resources in said network virtualization scenario, a host physically providing a portion of said resources in said network virtualization scenario, and a resource location specific to a certain implementation.

8. A method in a network virtualization scenario, comprising:
    determining, by a first network entity managing a virtualized network function, constraints related to said virtualized network function;
    transmitting, by said first network entity, information indicative of said constraints to a second network entity managing resource capacity in said network virtualization scenario; and
    deciding, by said second network entity, resources or resource capacity to be allocated for said virtualized network function, based on said information indicative of said constraints,
    wherein said constraints comprise at least one of an availability zone, an availability zone group including at least one availability zone, a virtualized infrastructure manager managing a set of said resources in said network virtualization scenario, a host physically providing a portion of said resources in said network virtualization scenario, and a resource location specific to a certain implementation, and
    wherein if said constraints comprise an availability zone group including a first availability zone and a second availability zone related to each other and if resources already allocated to said virtualized network function are associated with said first availability zone, in relation to said deciding, resources associated with said second availability zone are considered.

9. A system in a network virtualization scenario, said system comprising:
    a first network entity managing a virtualized network function; and
    a second network entity managing resource capacity in said network virtualization scenario, wherein
    said first network entity is configured to
    determine constraints related to said virtualized network function, and to
    transmit information indicative of said constraints to said second network entity, and wherein
    said second network entity is configured to
    decide resources or resource capacity to be allocated for said virtualized network function, based on said information indicative of said constraints, wherein said second network entity is configured to decide said resources or resource capacity to be allocated by investigating, if resources fulfilling said constraints are available, locating information related to said resources fulfilling said constraints, as indication of said resources or resource capacity to be allocated for said virtualized network function, and
    transmit said locating information, to said first network entity.

10. The system according to claim 9, wherein
    said first network entity is configured to
    detect, before said determining, a necessity for a resource related modification with respect to said virtualized network function, and to
    ascertain changes to resource consumption of said virtualized network function based on said necessity for said resource related modification.

11. The system according to claim 9, wherein
said second network entity is configured to
reserve, before said transmitting, said resources or resource capacity to be allocated for said virtualized network function.

12. The system according to claim 9, wherein
said second network entity is configured to transmit, if no resources fulfilling said constraints are available, information indicative of inability to fulfill said constraints, to said first network entity.

13. The system according to claim 9, wherein
said first network entity is configured to
receive, after said deciding, locating information indicative of said resources or resource capacity to be allocated for said virtualized network function, and to
transmit a resource creating request based on said locating information.

14. The system according to claim 9, wherein
said constraints are placement constraints constraining a placement of said resource to be allocated.

15. The system according to claim 9, wherein
said constraints comprise at least one of an availability zone, an availability zone group including at least one availability zone, a virtualized infrastructure manager managing a set of said resources in said network virtualization scenario, a host physically providing a portion of said resources in said network virtualization scenario, and a resource location specific to a certain implementation.

16. A system in a network virtualization scenario, said system comprising:
a first network entity managing a virtualized network function; and
a second network entity managing resource capacity in said network virtualization scenario, wherein
said first network entity is configured to
determine constraints related to said virtualized network function, and to
transmit information indicative of said constraints to said second network entity, and wherein
said second network entity is configured to
decide resources or resource capacity to be allocated for said virtualized network function, based on said information indicative of said constraints,
wherein
said constraints comprise at least one of an availability zone, an availability zone group including at least one availability zone, a virtualized infrastructure manager managing a set of said resources in said network virtualization scenario, a host physically providing a portion of said resources in said network virtualization scenario, and a resource location specific to a certain implementation,
wherein
said second network entity is configured to decide resources or resource capacity to be allocated, if said constraints comprise an availability zone group including a first availability zone and a second availability zone related to each other and if resources already allocated to said virtualized network function are associated with said first availability zone, considering resources associated with said second availability zone.

17. An apparatus in a network virtualization scenario for managing resource capacity in said network virtualization scenario, comprising:
at least one processor;
at least one memory including computer program code; and
at least one interface configured for communication with at least another apparatus;
the at least one processor, with the at least one memory and the computer program code, being configured to cause the apparatus to perform:
receiving information indicative of constraints related to a virtualized network function, the constraints being determined by and transmitted from a first network entity managing the virtualized network function, and
deciding resources or resource capacity to be allocated for said virtualized network function, based on said information indicative of said constraints, wherein the deciding said resources or resource capacity to be allocated comprises investigating, if resources fulfilling said constraints are available, locating information related to said resources fulfilling said constraints, as indication of said resources or resource capacity to be allocated for said virtualized network function, and
transmitting said locating information to said first network entity.

* * * * *